United States Patent
Sakka et al.

(10) Patent No.: US 10,589,591 B2
(45) Date of Patent: Mar. 17, 2020

(54) ACTIVE DAMPER SYSTEM ACTUATOR ARRANGEMENT

(71) Applicant: Tenneco Automotive Operating Company Inc., Lake Forest, IL (US)

(72) Inventors: Monzer Al Sakka, Sint-Truiden (BE); Miguel Dhaens, Lommel (BE); Christophe Lauwerys, Heverlee (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 195 days.

(21) Appl. No.: 15/903,415

(22) Filed: Feb. 23, 2018

(65) Prior Publication Data
US 2019/0263213 A1 Aug. 29, 2019

(51) Int. Cl.
*B60G 17/08* (2006.01)
*B60G 15/06* (2006.01)
(Continued)

(52) U.S. Cl.
CPC .............. *B60G 17/08* (2013.01); *B60G 3/06* (2013.01); *B60G 3/20* (2013.01); *B60G 13/08* (2013.01);
(Continued)

(58) Field of Classification Search
CPC . B60G 17/08; B60G 3/06; B60G 3/20; B60G 13/08; B60G 17/06; B60G 17/0272; B60G 15/062
See application file for complete search history.

(56) References Cited

U.S. PATENT DOCUMENTS 3,381,952 A * 5/1968 Stubblefield ......... B60G 15/063
267/34
3,684,269 A * 8/1972 Peddinghaus ......... F16F 9/3221
267/221
(Continued)

FOREIGN PATENT DOCUMENTS

DE 10203802 A1 10/2002
JP 2002257189 A 9/2002
(Continued)

OTHER PUBLICATIONS

International Search Report and Written Opinion issued in related PCT Application No. PCT/US2019/018308 dated Jun. 14, 2019.

*Primary Examiner* — Faye M Fleming
(74) *Attorney, Agent, or Firm* — Harness, Dickey & Pierce, P.L.C.

(57) ABSTRACT

A damper system for a vehicle is provided that includes a damper and actuator. The damper extends longitudinally along a damper axis between first and second damper ends. The actuator is separate and spaced apart from the damper. The actuator extends longitudinally along an actuator axis between first and second actuator ends. The damper and the actuator are arranged next to one another where the actuator axis is spaced from and substantially parallel to the damper axis. The damper and the actuator are positioned within a cylindrical packaging envelope that has a diameter of 300 millimeters or less. The cylindrical packaging envelope is an imaginary cylinder, which may be defined by one or more components of a vehicle's suspension system such as a coil spring or an upper suspension arm. The damper and the actuator are completely contained within the cylindrical packaging envelope.

20 Claims, 12 Drawing Sheets

(51) Int. Cl.
  *B60G 3/06*    (2006.01)
  *B60G 3/20*    (2006.01)
  *B60G 13/08*   (2006.01)

(52) U.S. Cl.
  CPC .......... *B60G 15/06* (2013.01); *B60G 15/062* (2013.01); *B60G 2200/14* (2013.01); *B60G 2202/30* (2013.01); *B60G 2202/312* (2013.01); *B60G 2202/412* (2013.01); *B60G 2202/413* (2013.01); *B60G 2202/42* (2013.01); *B60G 2500/10* (2013.01); *B60G 2800/162* (2013.01)

(56) References Cited

U.S. PATENT DOCUMENTS

| | | |
|---|---|---|
| 6,814,347 B1 | 11/2004 | Lemmens et al. |
| 7,591,337 B2 | 9/2009 | Suhre et al. |
| 7,956,797 B2 | 6/2011 | Talty et al. |
| 8,253,281 B2 | 8/2012 | Namuduri et al. |
| 9,068,623 B2 | 6/2015 | Gysen et al. |
| 2005/0017462 A1 | 1/2005 | Kroppe |
| 2008/0290624 A1 | 11/2008 | Yamanaka et al. |
| 2009/0121444 A1 | 5/2009 | Bushko et al. |
| 2016/0001623 A1 | 1/2016 | Cox et al. |

FOREIGN PATENT DOCUMENTS

| | | |
|---|---|---|
| WO | 2010101312 A1 | 9/2010 |
| WO | WO-2016023628 A1 | 2/2016 |

\* cited by examiner

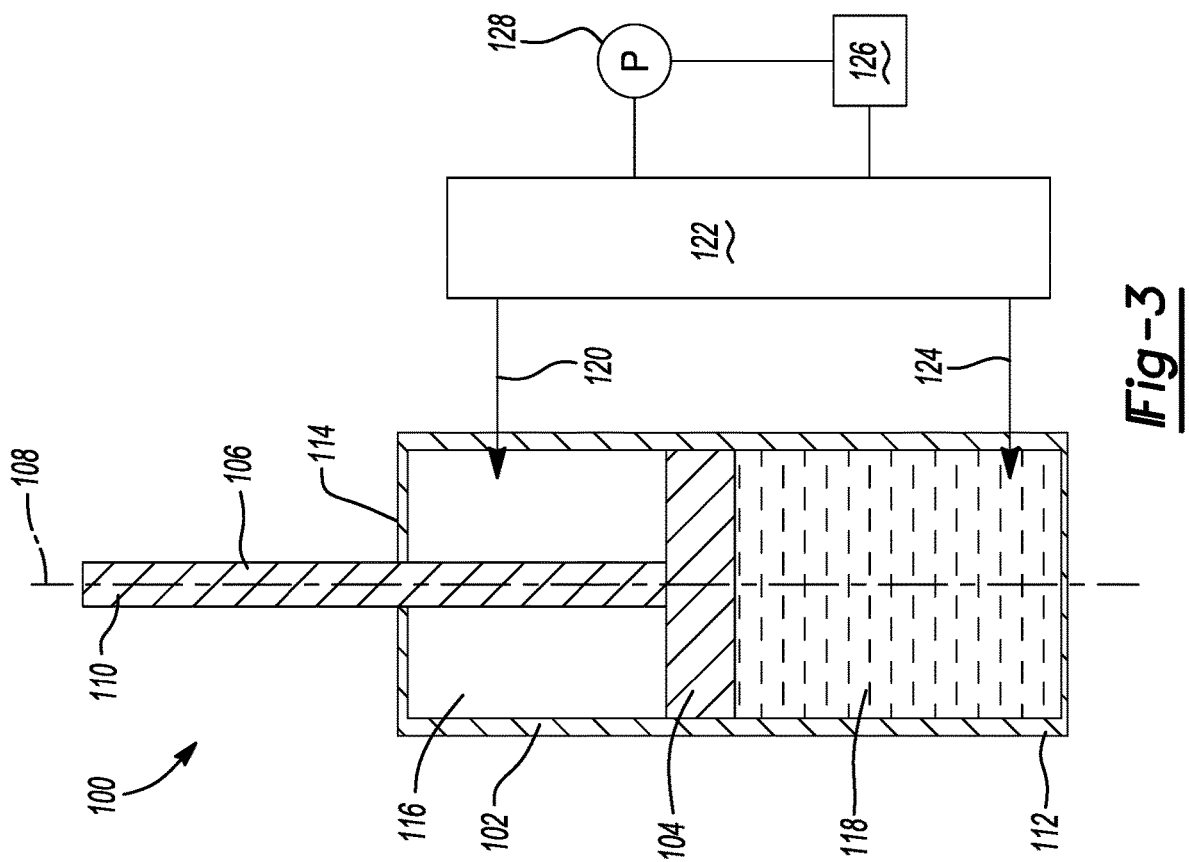
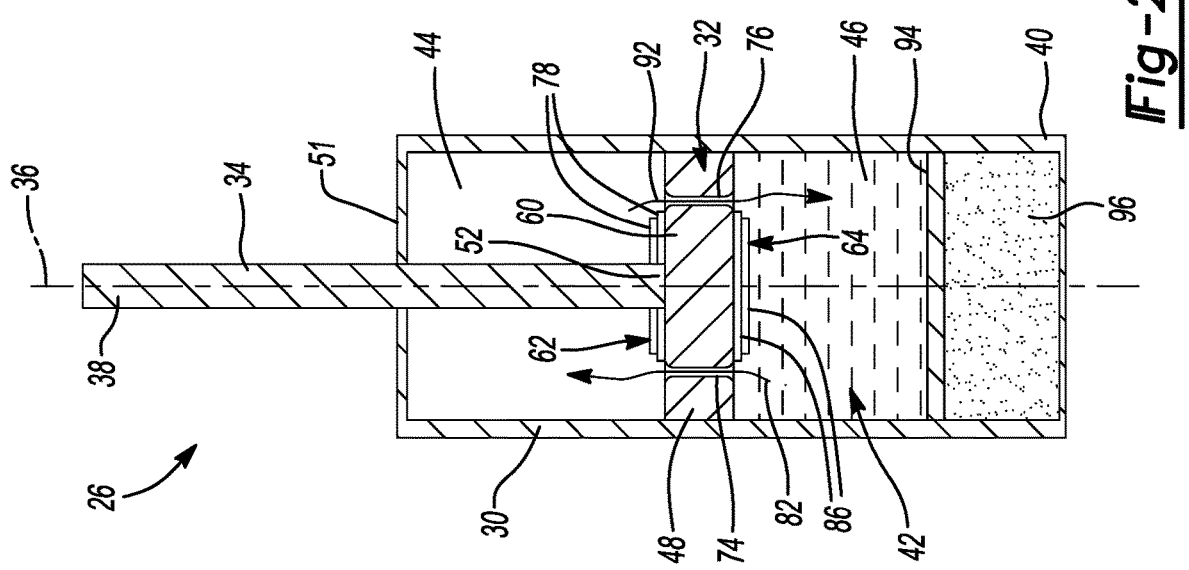

ACTIVE DAMPER SYSTEM ACTUATOR ARRANGEMENT

FIELD

The present disclosure relates to automotive shock absorbers/dampers. More particularly, the present disclosure relates to active shock absorbers/dampers that use a hydraulic, pneumatic, or electro-magnetic actuator to provide a different magnitude of damping based on a frequency as well as a velocity of an input to the shock absorber/damper.

BACKGROUND

The statements in this section merely provide background information related to the present disclosure and may not constitute prior art.

Shock absorbers are typically used in conjunction with automotive suspension systems or other suspension systems to absorb unwanted vibrations that occur during movement of the suspension system. In order to absorb these unwanted vibrations, automotive shock absorbers are generally connected between the sprung (body) and the unsprung (suspension/drivetrain) masses of the vehicle.

In typical shock absorbers, a piston is located within a fluid chamber defined by an outer tube and is connected to the sprung mass of the vehicle through a piston rod. The outer tube is connected to the unsprung mass of the vehicle. The piston divides the fluid chamber of the outer tube into an upper working chamber and a lower working chamber. The piston includes compression valving that limits the flow of hydraulic fluid from the lower working chamber to the upper working chamber during a compression stroke. The piston also includes rebound valving that limits the flow of hydraulic fluid from the upper working chamber to the lower working chamber during a rebound or extension stroke. Because the compression valving and the rebound valving have the ability to limit the flow of hydraulic fluid, the shock absorber is able to produce a damping force that counteracts oscillations/vibrations, which would otherwise be transmitted from the unsprung mass to the sprung mass.

By controlling the fluid flow between the two working chambers, a pressure drop is built up between the two working chambers and this contributes to the damping forces of the shock absorber. The compression and rebound valving and the check valve assemblies can be used to tune the damping forces to control ride and handling as well as noise, vibration, and harshness.

Typical passive shock absorbers provide the same magnitude of damping force regardless of the frequency of the input. For a given input velocity, the damping force generated by a conventional passive shock absorber remains the same regardless of the frequency of the input. Typically, the primary ride frequency of a passenger vehicle is in the range of 1 to 2 Hertz. When a vehicle goes over a road surface with a lower frequency input, a higher amount of damping is preferred to manage the road inputs. During handling events (where directional stability is critical), a higher amount of damping is also preferred. For example, the vehicle may be subjected to body roll during handling events. The frequency of body roll in a typical passenger vehicle commonly ranges from 2 to 4 Hertz depending on the roll-stiffness and the height of the center of gravity of the vehicle. When the damper system experiences larger excitation forces, higher damping forces are required. When conventional passive shock absorbers are used, the higher damping forces result in more harshness and a decrease in ride quality.

Active shock absorbers change the damping of the shock absorber in real-time to address different vehicle suspension inputs. In active shock absorbers, hydraulic, pneumatic, or electro-magnetic actuators are used to apply an active force to the piston rod that is independent of the damping forces generated by the compression and rebound valving.

Unlike passive shock absorbers, active shock absorbers can generate damping forces independently of the velocity of the piston rod inputs. As a result, large excitation forces do not require more hydraulic damping from the shock absorber and therefore do not introduce increased harshness. This is a major advantage of active shock absorbers because it resolves the trade-off in hydraulic damper systems between primary body control (which requires large damping forces) and secondary comfort (which requires low damping forces).

The actuator(s) in typical active shock absorbers are placed in a co-axial arrangement with the damper. In co-axial actuator/damper arrangements, the damper must be designed to accommodate the actuator components. Accordingly, these designs are often expensive to manufacture and there are typically limits on the size of the actuator and the damper due to limited packaging space and their co-axial arrangement.

SUMMARY

This section provides a general summary of the disclosure, and is not a comprehensive disclosure of its full scope or all of its features.

In accordance with one aspect of the subject disclosure, a damper system for a vehicle is provided. The damper system includes a damper and an actuator. The damper extends longitudinally along a damper axis between a first damper end and a second damper end. The actuator is separate and spaced apart from the damper. The actuator extends longitudinally along an actuator axis between a first actuator end and a second actuator end. The damper and the actuator are arranged next to one another where the actuator axis is spaced from and substantially parallel to the damper axis. The damper and the actuator are positioned within a cylindrical packaging envelope that has a diameter of 300 millimeters or less. The cylindrical packaging envelope is an imaginary cylinder, which may be defined by one or more components of a vehicle's damper system. For example and without limitation, the cylindrical packaging envelope may be defined by a coil spring or an upper suspension arm of the damper system. The damper and the actuator are completely contained within the cylindrical packaging envelope.

Advantageously, the damper systems of the subject disclosure have a small packaging envelope without the expense and complexity of designs with an actuator that is co-axially arranged with the damper. Because the damper and the actuator are separate components, they are cheaper to manufacture and the actuator can be replaced independently of the damper and vice versa lowering replacement costs for the end user/consumer. In addition, the components of the actuator do not need to be designed to fit within the packaging constraints of the damper. As a result, higher capacity actuators can be used. Another advantage of the damper systems of the subject disclosure is that they can be installed in vehicles without extensive modifications to the vehicle's suspension system.

Further areas of applicability and advantages will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 2 is a schematic diagram of an exemplary damper;

FIG. 3 is a schematic diagram of an exemplary hydraulic actuator;

Corresponding reference numerals indicate corresponding parts throughout the several views of the drawings.

DETAILED DESCRIPTION

Figure 1:
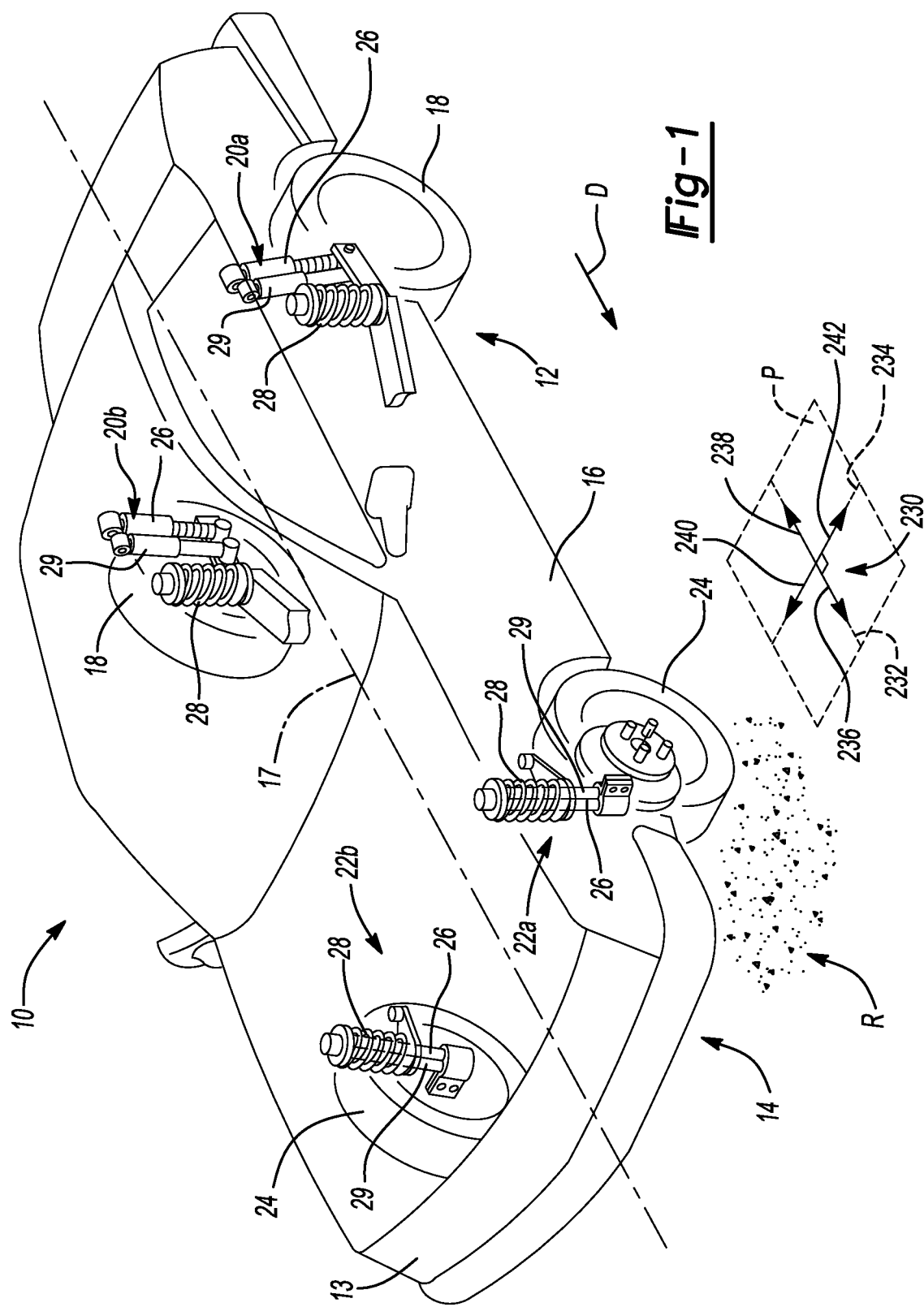
FIG. 1 is an illustration of an exemplary vehicle equipped with damper systems constructed in accordance with the teachings of the present disclosure.

The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly. In addition, the term "substantially parallel" as used herein means that the angle between the two components, axes, or planes can range plus or minus 5 degrees from a parallel orientation (i.e., an angle of zero degrees). The term "substantially perpendicular" as used herein means that the angle between the two components, axes, or planes can range plus or minus 5 degrees from a perpendicular orientation (i.e., an angle of 90 degrees).

Referring to FIG. 1, a vehicle 10 including a rear suspension 12, a front suspension 14, and a body 16 is illustrated. Rear suspension 12 has a transversely extending rear axle assembly (not shown) adapted to operatively support the vehicle's rear wheels 18. The rear axle assembly is operatively connected to body 16 by two damper systems 20a, 20b. Similarly, front suspension 14 includes a transversely extending front axle assembly (not shown) to operatively support the vehicle's front wheels 24. The front axle assembly is operatively connected to body 16 by another two damper systems 22a, 22b.

Each damper system 20a, 20b, 22a, 22b includes a damper 26, a helical coil spring 28, and an actuator 29. In damper systems 22a and 22b, both the damper 26 and the actuator 29 are arranged within the coil spring 28 in what may be referred to as a coil-over arrangement. By contrast, in damper systems 20a and 20b, the damper 26, coil spring 28, and actuator 29 are spaced apart from one another. Although FIG. 1 illustrates using a coil-over arrangement for the front suspension 14 and a spaced apart arrangement for the rear suspension 12, it should be appreciated that different arrangements are possible, including arrangements where similar damper systems are used at all four corners of the vehicle 10.

While the vehicle 10 has been depicted in FIG. 1 as a passenger car having front and rear axle assemblies, damper systems 20a, 20b, 22a, 22b may be used with other types of vehicles or machinery, or in other types of applications such as vehicles incorporating independent front and/or independent rear suspension systems. Further, the term "damper system" as used herein is meant to refer to spring/damper systems in general and thus will include MacPherson struts.

The dampers 26 serve to dampen the relative motion of the unsprung portion of the front and rear suspension 14, 12 and the sprung portion (i.e., body 16) of vehicle 10 by applying a damping force to the vehicle 10 that opposes the relative motion of the unsprung portion of the front and rear suspension 14, 12 and the sprung portion (i.e., body 16) of vehicle 10. The coil springs 28 apply a biasing force to the sprung portion (i.e., body 16) of vehicle 10, which supports the sprung portion (i.e., body 16) of vehicle 10 on the unsprung portion of the front and rear suspension 14, 12 in such a manner that bumps and other impacts are absorbed by the front and rear suspension 14, 12.

The actuators 29 are located next to the dampers 26. Therefore, the actuators 29 are separate and spaced from the dampers 26. When activated, the actuators 29 apply an active force on the vehicle 10 to soften or firm up the suspension 12, 14 depending on driver inputs, the speed of the vehicle 10, and road conditions. Generally, the active force operates in a substantially parallel direction to the biasing force of the coil springs 28. For example, during hard right-hand cornering, the actuators 29 of the damper systems 20a and 22a on the outside of the turn may be operated to apply an active force to the vehicle 10 to help keep the vehicle 10 level during the turn. In another example, during hard left-hand cornering, the actuators 29 of the damper systems 20b and 22b on the outside of the turn may be operated to apply an active force to the vehicle 10 to help keep the vehicle 10 level during the turn. Therefore, the actuators 29 actively control body movements of the vehicle 10 independently of the damping forces generated by the dampers 26. In other words, the actuators 29 operate in parallel with the dampers 26 to control the ride and handling of the vehicle 10.

FIG. 2 illustrates an exemplary damper 26 in greater detail. The damper 26 comprises an outer tube 30, a piston assembly 32, and a piston rod 34. The damper 26 extends longitudinally along a damper axis 36 between a first damper end 38 and a second damper end 40. The piston rod 34 extends out from the outer tube 30 to define the first damper end 38 and the outer tube 30 defines the second damper end 40. The outer tube 30 and the piston rod 34 extend co-axially along the damper axis 36. Outer tube 30 defines an internal cavity 42. Piston assembly 32 is slidably disposed within the internal cavity 42 of the outer tube 30 and divides the internal cavity 42 into a first working chamber 44 and a second working chamber 46. A seal 48 is disposed between piston assembly 32 and outer tube 30 to permit sliding movement of piston assembly 32 with respect to outer tube 30 without generating undue frictional forces as well as sealing the first working chamber 44 from the second working chamber 46.

Piston rod 34 is attached to piston assembly 32 and extends through the first working chamber 44 and through a rod side end 51 of the outer tube 30. The piston rod 34 extends longitudinally between a proximal end 52 (which is disposed within the internal cavity 42 of the outer tube 30 and connected to the piston assembly 32) and the first damper end 38 (which is positioned outside the outer tube 30). In the illustrated embodiment, the second damper end 40 is connected to the body 16 (i.e., the sprung portion of vehicle 10) and the first damper end 38 is connected to the unsprung portion of the suspension 12, 14; however, this arrangement may be reversed. Outer tube 30 is filled with a hydraulic fluid. The first working chamber 44 is positioned between the rod side end 51 of the outer tube 30 and the piston assembly 32 and the second working chamber 46 is positioned between the second damper end 40 and the piston assembly 32. Suspension movements of the vehicle 10 will cause extension/rebound or compression movements of piston assembly 32 with respect to outer tube 30. Valving within piston assembly 32 controls the movement of hydraulic fluid between the first working chamber 44 and the second working chamber 46 during movement of piston assembly 32 within outer tube 30.

The piston assembly 32 comprises a piston body 60 that is attached to the proximal end 52 of the piston rod 34, a compression valve assembly 62, and a rebound valve assembly 64. Piston body 60 defines a plurality of compression flow passages 74 and a plurality of rebound flow passages 76. The compression valve assembly 62 operates to control fluid flow of the hydraulic fluid through the plurality of compression flow passages 74 in the piston body 60 and the rebound valve assembly 64 operates to control fluid flow of the hydraulic fluid through the plurality of rebound flow passages 76 in the piston body 60. Therefore, both the compression valve assembly 62 and the rebound valve assembly 64 control fluid flow between the first and second working chambers 44, 46.

Compression valve assembly 62 comprises a plurality of compression valve plates 78. The compression valve plates 78 are disposed adjacent to piston body 60 to cover the plurality of compression flow passages 74. During a compression stroke of shock absorber 26, fluid pressure builds up in the second working chamber 46 until the fluid pressure applied to the compression valve plates 78, through the plurality of compression flow passages 74, overcomes the load required to deflect the plurality of compression valve plates 78. The compression valve plates 78 elastically deflect to open the compression flow passages 74 and allow the hydraulic fluid to flow from the second working chamber 46 to the first working chamber 44 as shown by arrows 82 in FIG. 2.

Rebound valve assembly 64 comprises a plurality of rebound valve plates 86. The rebound valve plates 86 are disposed adjacent to piston body 60 to cover the plurality of rebound flow passages 76 to close the plurality of rebound flow passages 76. During an extension or rebound stroke of the shock absorber 26, fluid pressure builds up in the first working chamber 44 until the fluid pressure applied to the rebound valve plates 86, through the rebound flow passages 76, overcomes the load required to deflect rebound valve plates 86. The plurality of rebound valve plates 86 elastically deflect thereby opening the rebound flow passages 76 to allow the hydraulic fluid to flow from the first working chamber 44 to the second working chamber 46 as shown by arrows 92 in FIG. 2. Optionally, the outer tube 30 may contain a floating piston 94 at the second damper end 40 that creates a gas chamber 96 within the outer tube 30. Gas within the gas chamber 96 operates to pressurize the hydraulic fluid in the first and/or second working chambers 44, 46.

Figure 5:
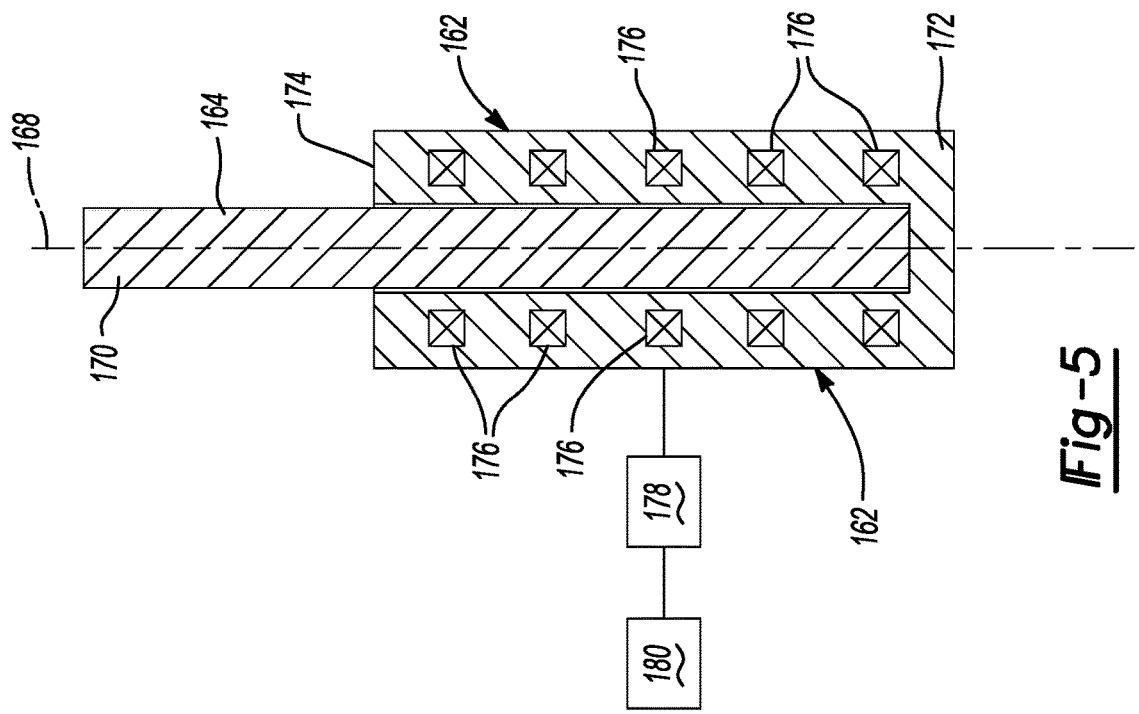
FIG. 5 is a schematic diagram of an exemplary electromagnetic actuator.
Figure 4:
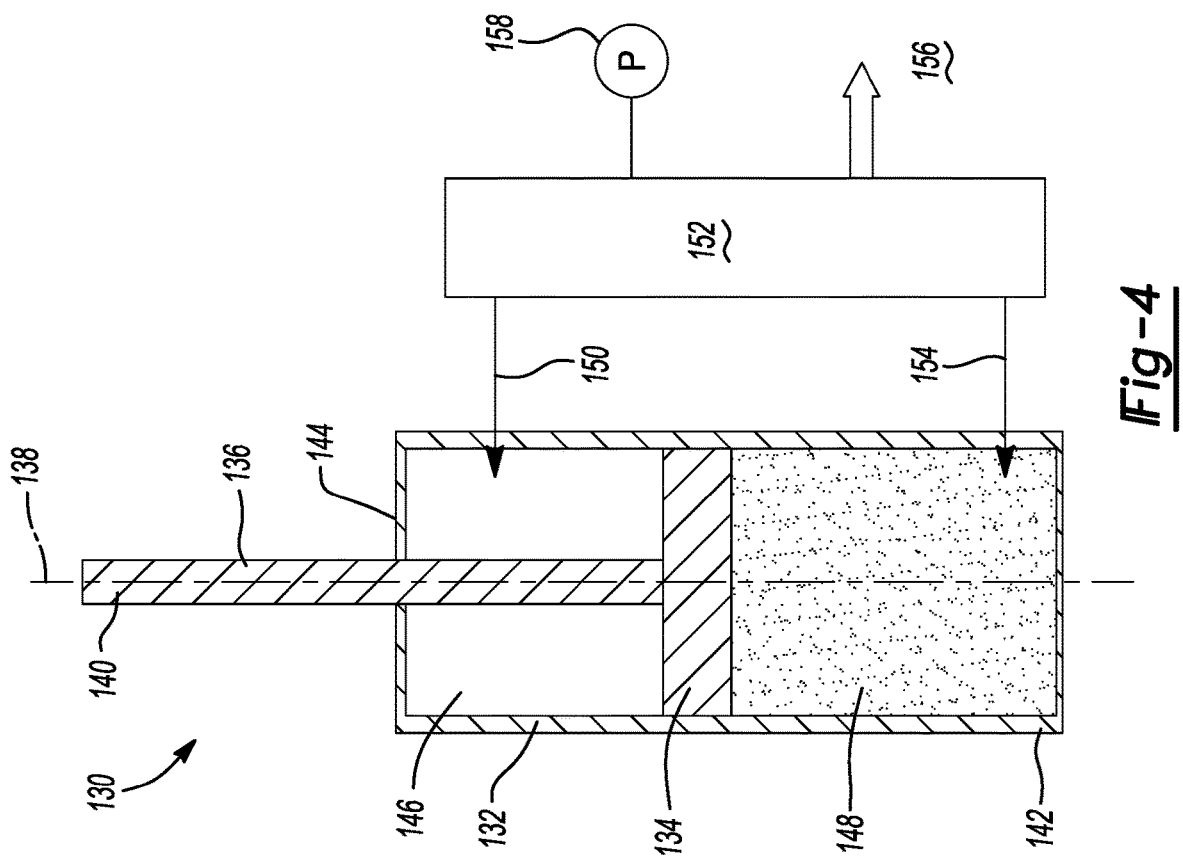
FIG. 4 is a schematic diagram of an exemplary pneumatic actuator.
Figure 6:
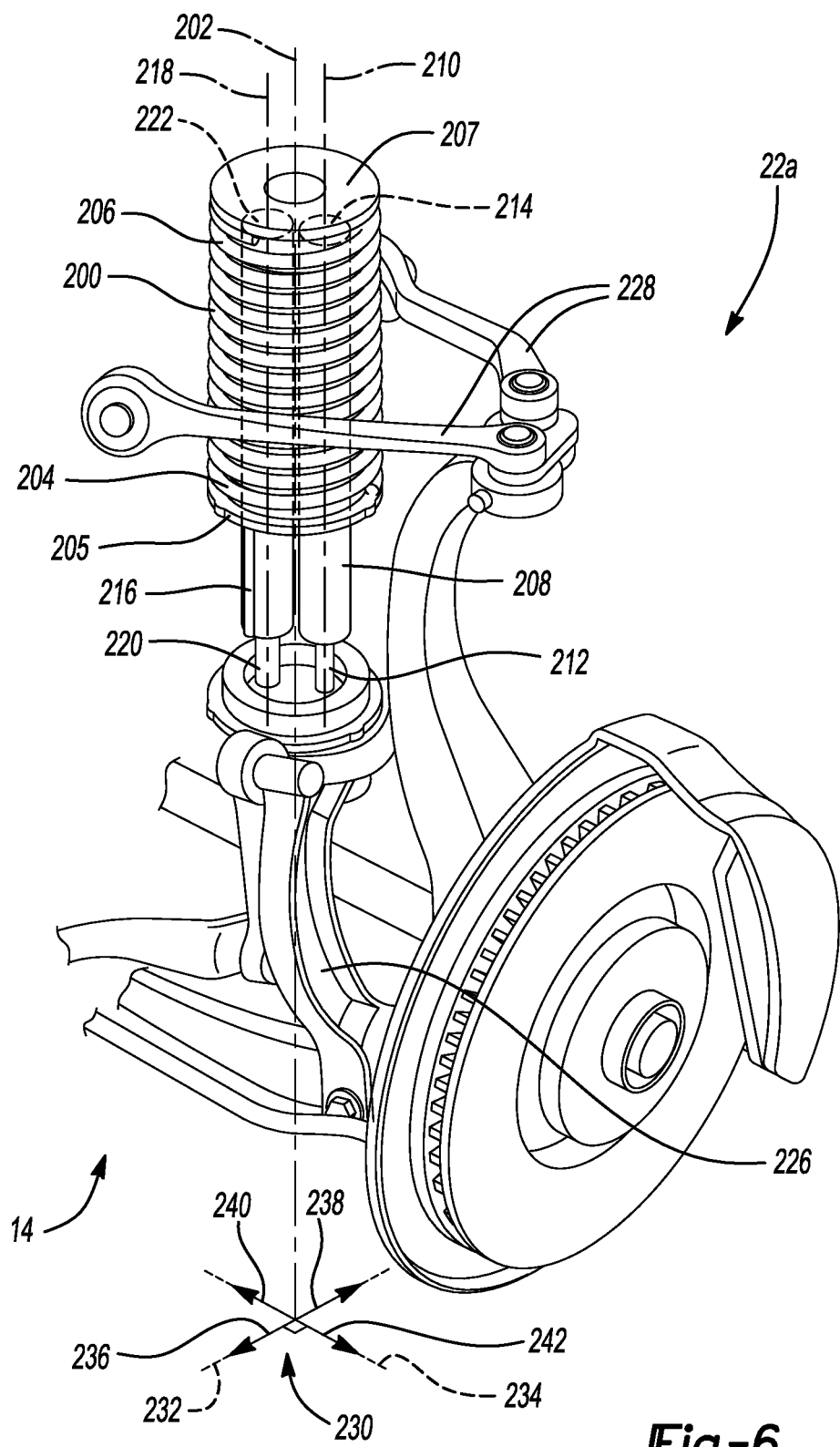
FIG. 6 is a side perspective view of an exemplary damper system constructed in accordance with the teachings of the present disclosure.

FIGS. 3-5 illustrate exemplary actuators. In FIG. 3, hydraulic actuator 100 is shown, which includes a cylinder housing 102, a piston 104 slidably disposed within the cylinder housing 102, and an output shaft 106 that is connected to the piston 104. The actuator 100 extends longitudinally along an actuator axis 108 between a first actuator end 110 and a second actuator end 112. The output shaft 106 is co-axially arranged with the cylinder housing 102 about the actuator axis 108. The output shaft 106 extends out through a shaft side end 114 in the cylinder housing 102 to define the first actuator end 110 and the cylinder housing 102 extends from the shaft side end 114 to the second actuator end 112. The second actuator end 112 may be connected to the body 16 (i.e., the sprung portion of vehicle 10) and the first actuator end 110 may be connected to the unsprung portion of the suspension 12, 14; however, this arrangement may be reversed.

The cylinder housing 102, which contains hydraulic fluid, is divided into a first cylinder chamber 116 and a second cylinder chamber 118 by piston 104. The first cylinder chamber 116 is positioned between the piston 104 and the shaft side end 114 of the cylinder housing 102 and the second cylinder chamber 118 is positioned between the piston 104 and the second actuator end 112. A first hydraulic line 120 leads from a hydraulic valve assembly 122 to the first cylinder chamber 116 and a second hydraulic line 124 leads from the hydraulic valve assembly 122 to the second cylinder chamber 118. The hydraulic valve assembly 122 is arranged in fluid communication with a fluid tank 126 and a hydraulic pump 128. Operation of the hydraulic valve assembly 122 and the hydraulic pump 128 moves the piston 104 and thus the output shaft 106 along the actuator axis 108 between a retracted position and an extended position. To move the output shaft 106 from the retracted position to the extended position, the hydraulic valve assembly 122 and the hydraulic pump 128 supply hydraulic fluid to the second hydraulic line 124, which increases pressure in the second cylinder chamber 118. At the same time, the hydraulic valve assembly 122 allows hydraulic fluid to flow out of the first cylinder chamber 116, through the first hydraulic line 120, and to the fluid tank 126. This causes the piston 104 to move towards the shaft side end 114 of the cylinder housing 102, which results in the output shaft 106 applying an active force to the unsprung portion of the suspension 12, 14 (or the body 16 depending on the orientation of the actuator 100). To move the output shaft 106 from the extended position to the retracted position, the hydraulic valve assembly 122 and the hydraulic pump 128 supply hydraulic fluid to the first hydraulic line 120, which increases pressure in the first cylinder chamber 116. At the same time, the hydraulic valve assembly 122 allows hydraulic fluid to flow out of the second cylinder chamber 118, through the second hydraulic line 124, and to the fluid tank 126. This causes the piston 104 and the output shaft 106 to move towards the second actuator end 112.

In FIG. 4, pneumatic actuator 130 is shown, which includes a cylinder housing 132, a piston 134 slidably disposed within the cylinder housing 132, and an output shaft 136 that is connected to the piston 134. The actuator 130 extends longitudinally along an actuator axis 138 between a first actuator end 140 and a second actuator end 142. The output shaft 136 is co-axially arranged with the cylinder housing 132 about the actuator axis 138. The output shaft 136 extends out through a shaft side end 144 in the cylinder housing 132 to define the first actuator end 140 and the cylinder housing 132 extends from the shaft side end 144 to the second actuator end 142. The second actuator end 142 may be connected to the body 16 (i.e., the sprung portion of vehicle 10) and the first actuator end 140 may be connected to the unsprung portion of the suspension 12, 14; however, this arrangement may be reversed.

The cylinder housing 132, which contains pressurized air, is divided into a first cylinder chamber 146 and a second cylinder chamber 148 by piston 134. The first cylinder chamber 146 is positioned between the piston 134 and the shaft side end 144 of the cylinder housing 132 and the second cylinder chamber 148 is positioned between the piston 134 and the second actuator end 142. A first pneumatic line 150 leads from a pneumatic valve assembly 152 to the first cylinder chamber 146 and a second pneumatic line 154 leads from the pneumatic valve assembly 152 to the second cylinder chamber 148. The pneumatic valve assembly 152 is vented to the atmosphere 156 and is also arranged in fluid communication with a pneumatic pump 158. Operation of the pneumatic valve assembly 152 and the pneumatic pump 158 moves the piston 134 and thus the output shaft 136 along the actuator axis 138 between a retracted position and an extended position. To move the output shaft 136 from the retracted position to the extended position, the pneumatic valve assembly 152 and the pneumatic pump 158 supply pressurized air to the second pneumatic line 154, which increases pressure in the second cylinder chamber 148. At the same time, the pneumatic valve assembly 152 allows air to flow out of the first cylinder chamber 146, through the first pneumatic line 150, and out into the atmosphere 156. This causes the piston 134 to move towards the shaft side end 144 of the cylinder housing 132, which results in the output shaft 136 applying an active force to the unsprung portion of the suspension 12, 14 (or the body 16 depending on the orientation of the actuator 130). To move the output shaft 136 from the extended position to the retracted position, the pneumatic valve assembly 152 and the pneumatic pump 158 supply pressurized air to the first pneumatic line 150, which increases pressure in the first cylinder chamber 146. At the same time, the pneumatic valve assembly 152 allows air to flow out of the second cylinder chamber 148, through the second pneumatic line 154, and out into the atmosphere 156. This causes the piston 134 and the output shaft 136 to move towards the second actuator end 142.

In FIG. 5 an electro-magnetic actuator 160 is shown, which includes a stator 162 and an armature 164 that is slidably disposed within the stator 162. The actuator 160 extends longitudinally along an actuator axis 168 between a first actuator end 170 and a second actuator end 172. The armature 164 is co-axially arranged with the stator 162 about the actuator axis 168. The armature 164 extends through an open end 174 in the stator 162 and to the first actuator end 170 and the stator 162 extends from the open end 174 to the second actuator end 172. The second actuator end 172 may be connected to the body 16 (i.e., the sprung portion of vehicle 10) and the first actuator end 170 may be connected to the unsprung portion of the suspension 12, 14; however, this arrangement may be reversed.

The armature 164 is made from a material that is magnetized. By way of example and without limitation, the armature 164 may be made of iron, terrific stainless steel, or an array of permanent magnets (not shown). The stator 162 includes a plurality of coils 176. The plurality of coils 176 extend annularly about the armature 164 such that the armature 164 is free to slide longitudinally relative to the stator 162. A driver 178 that is electrically connected to a power supply 180 sends electric current to the plurality of coils 176. When this occurs, the plurality of coils 176 generate an electro-magnetic field that interacts with the armature 164 (e.g., Lorentz force) to apply an active force to the body of the vehicle 10. The interaction between the electro-magnetic field and the armature 164 causes the armature 164 to be pushed towards or away from the second actuator end 172 depending upon the direction of polarity of the electro-magnetic field.

It should be appreciated that each of the exemplary actuators 100, 130, 160 described above are components that apply an active force to control movement (e.g., pitch, heave, and roll) of the body 16 and/or movement of the unsprung portion of the suspension 12, 14 of the vehicle 10. Each of the actuators 100, 130, 160 are "movers" that are powered by an external power source, in the form of hydraulic pump 128, pneumatic pump 158, or power supply 180, which may be controlled by a controller (not shown). As a result, it should be appreciated that the actuators 100, 130, 160 are functionally and structurally distinct from the dampers 26. By contrast, dampers 26 absorb the vibrational energy imparted to the suspension 12, 14 of the vehicle 10 by resisting motion via viscous friction. As a result, typical dampers do not require an external power source.

With reference to FIGS. 6-10, various configurations of damper system 22a are shown. In each of these configurations, coil spring 200 extends helically about a spring axis 202 and longitudinally between a first spring end 204 and a second spring end 206. The first spring end 204 abuts a spring seat 205 and the second spring end 206 abuts an upper mount 207 that is connected to the body 16 of the vehicle 10. The coil spring 200 has an inner diameter ID that is measured across the inside of the coil as shown in FIGS. 7-10. Damper 208 extends longitudinally along a damper axis 210 between a first damper end 212 and a second damper end 214. Actuator 216 extends longitudinally along an actuator axis 218 between a first actuator end 220 and a second actuator end 222. The damper 208 and the actuator 216 are arranged next to one another within the inner diameter ID of the coil spring 200 with the actuator axis 218 spaced from and substantially parallel to the damper axis 210. Accordingly, it should be appreciated that the actuator 216 is separate and spaced apart from the damper 208 as opposed to an arrangement where the actuator 216 is integrated into the damper 208, such as where the damper axis 210 and the actuator axis 218 are co-axially aligned. The coil spring 200 extends annularly about the damper 208 and the actuator 216 such that the coil spring 200 defines a cylindrical packaging envelope 224 within which the damper 208 and the actuator 216 are arranged. As a result, the diameter of the cylindrical packaging envelope 224 equals the inner diameter ID of the coil spring 200. It should be appreciated that while the cylindrical packaging envelope 224 has boundary lines, the cylindrical packaging envelope 224 represents a geometric space and therefor has no physical walls or frame.

The front suspension 14 includes a lower suspension arm 226 and an upper suspension arm 228, which are pivotally connected to the body 16 of the vehicle 10. In the illustrated example, the first damper end 212 and the first actuator end 220 are pivotally connected to the lower suspension arm 226 and the second damper end 214 and the second actuator end 222 are pivotally connected to the upper mount 207. Of course it should be appreciated that other configurations are possible. For example, the orientation of the damper 208 and the actuator 216 could be reversed. As shown in FIGS. 6-10, the upper suspension arm 228 has a wish-bone shape and extends at least partially about the coil spring 200.

With reference to FIGS. 1 and 6-10, the damper 208 and the actuator 216 are positioned in a Cartesian coordinate system 230 with an x-axis 232 that is substantial parallel with a driving direction D of the vehicle 10 and a y-axis 234 that is substantially perpendicular to the driving direction D of the vehicle 10. It should be appreciated that the Cartesian coordinate system 230 lies in a plane P that is substantially parallel with road surface R. The x-axis 232 extends in a forward direction 236 that points toward a front end 13 of the vehicle 10 and a rearward direction 238 that points toward a rear end 15 of the vehicle 10. The y-axis 234 extends in an inboard direction 240 that points toward a centerline 17 of the vehicle 10 and an outboard direction 242 that points away from the centerline 17 of the vehicle 10.

Figure 7:
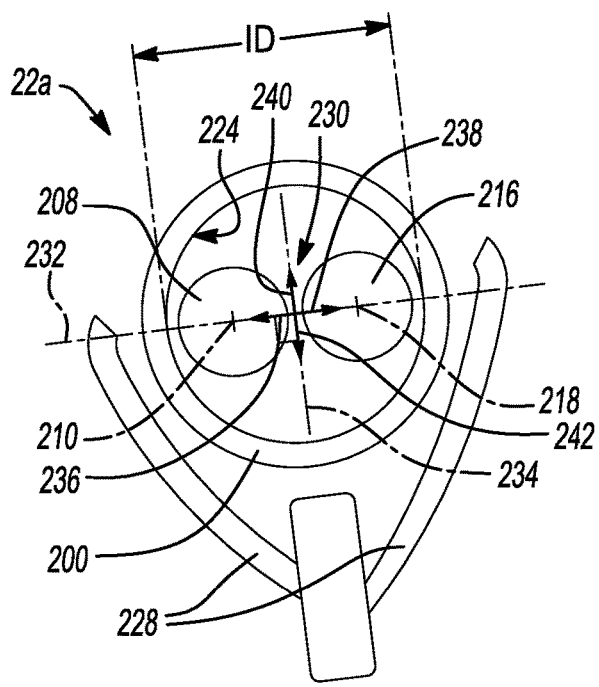
FIG. 7 is a top plan view of one exemplary configuration of the damper system illustrated in FIG. 6 where the damper is located forward of the actuator.
Figure 8:
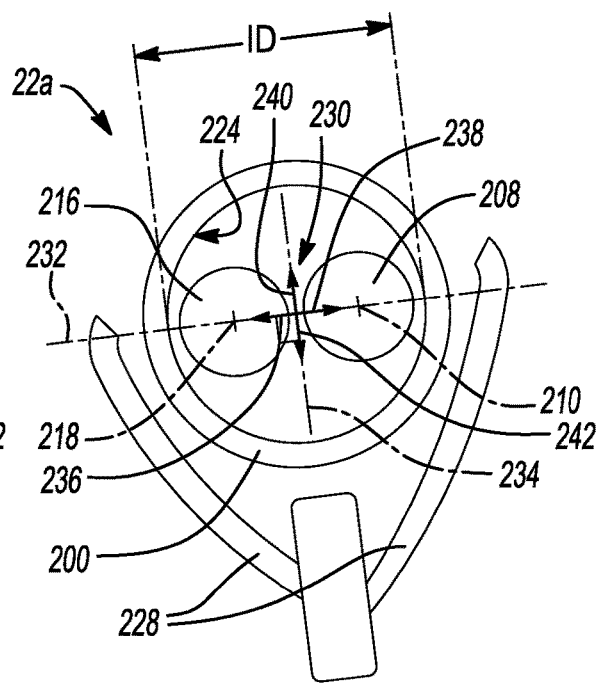
FIG. 8 is a top plan view of another exemplary configuration of the damper system illustrated in FIG. 6 where the actuator is located forward of the damper.

In FIGS. 7 and 8, the damper 208 and the actuator 216 are arranged along the x-axis 232 of the Cartesian coordinate system 230. In other words, the damper axis 210 and the actuator axis 218 intersect the x-axis 232 of the Cartesian coordinate system 230. In FIG. 7, the damper 208 is positioned forward of the actuator 216. This means that the damper 208 is spaced from the actuator 216 in the forward direction 236, or in other words, the damper 208 is closer to the front end 13 of the vehicle 10 than the actuator 216. In FIG. 8, the relative position of the damper 208 and the actuator 216 have been reversed. In FIG. 8, the actuator 216 is positioned forward of the damper 208. This means that the actuator 216 is spaced from the damper 208 in the forward direction 236, or in other words, the actuator 216 is closer to the front end 13 of the vehicle 10 than the damper 208.

Figure 9:
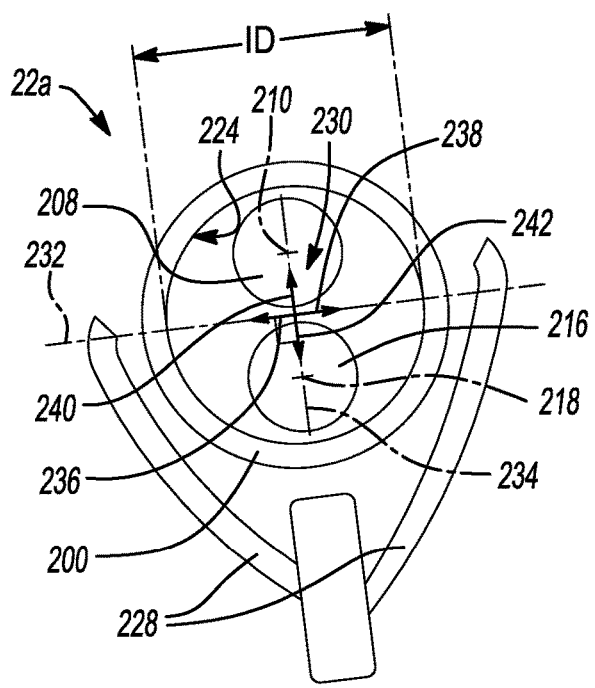
FIG. 9 is a top plan view of another exemplary configuration of the damper system illustrated in FIG. 6 where the damper is located inboard of the actuator.
Figure 10:
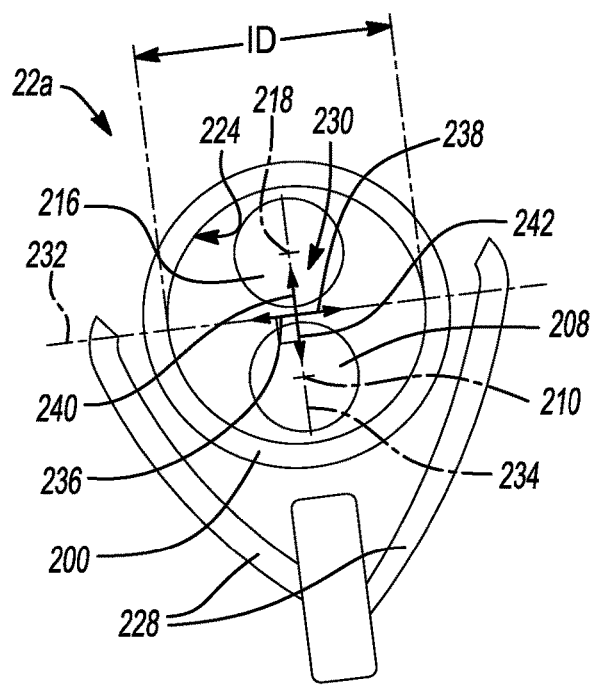
FIG. 10 is a top plan view of another exemplary configuration of the damper system illustrated in FIG. 6 where the damper is located outboard of the actuator.

In FIGS. 9 and 10, the damper 208 and the actuator 216 are arranged along the y-axis 234 of the Cartesian coordinate system 230. In other words, the damper axis 210 and the actuator axis 218 intersect the y-axis 234 of the Cartesian coordinate system 230. In FIG. 9, the damper 208 is positioned inboard of the actuator 216. This means that the damper 208 is spaced from the actuator 216 in the inboard direction 240, or in other words, the damper 208 is closer to the centerline 17 of the vehicle 10 than the actuator 216. In FIG. 10, the relative position of the damper 208 and the actuator 216 have been reversed. In FIG. 10, the damper 208 is positioned outboard of the actuator 216. This means that the damper 208 is spaced from the actuator 216 in the outboard direction 242, or in other words, the actuator 216 is closer to the centerline 17 of the vehicle 10 than the damper 208.

Figure 11:
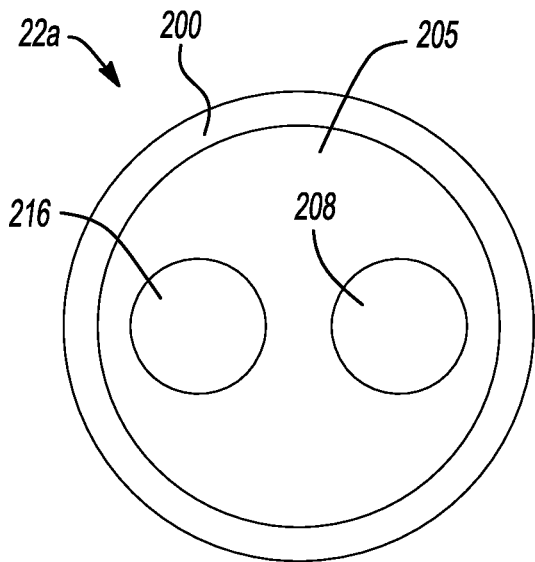
FIG. 11 is a top plan view of one exemplary configuration of the damper system illustrated in FIG. 6 where the spring seat is attached to the damper and the actuator.
Figure 12:
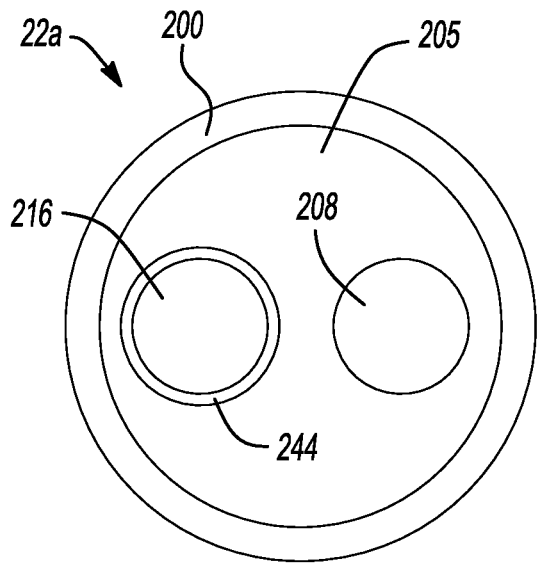
FIG. 12 is a top plan view of another exemplary configuration of the damper system illustrated in FIG. 6 where the spring seat is attached to the damper and not the actuator.
Figure 13:
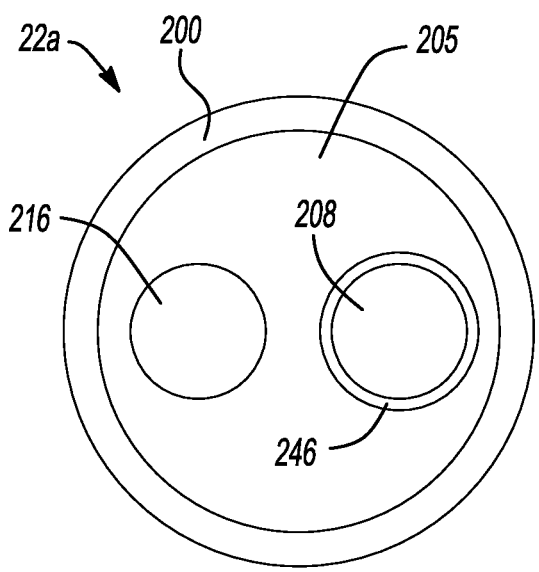
FIG. 13 is a top plan view of another exemplary configuration of the damper system illustrated in FIG. 6 where the spring seat is attached to the actuator and not the damper.
Figure 14:
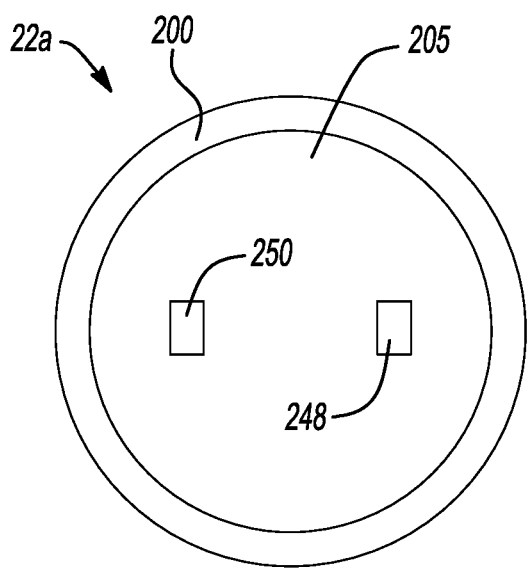
FIG. 14 is a top plan view of another exemplary configuration of the damper system illustrated in FIG. 6 where the spring seat is attached to the lower suspension arm.
Figure 15:
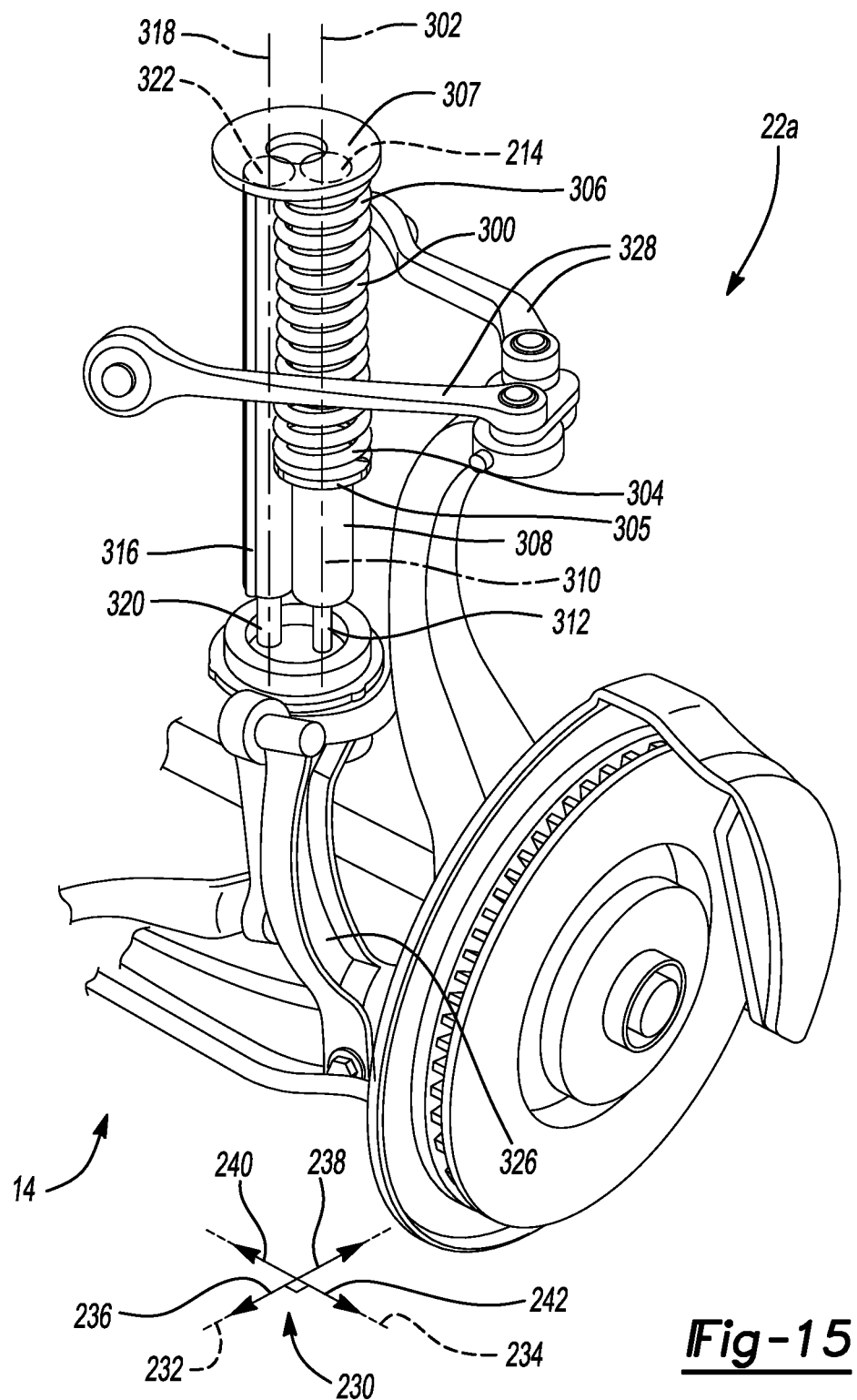
FIG. 15 is a side perspective view of another exemplary damper system constructed in accordance with the teachings of the present disclosure.

As shown in FIGS. 11-14, the spring seat 205 may have several configurations. Regardless of the configuration, the spring seat 205 supports the first spring end 204. The second spring end 206 is supported by the upper mount 207, which is coupled to the body 16 of the vehicle 10. Both the spring seat 205 and the upper mount 207 have an annular, dish-like shape. In FIGS. 11-13, the spring seat 205 is positioned longitudinally between the second damper end 214 and the rod side end of the outer tube of the damper 208. Thus, the spring seat 205 is also positioned longitudinally between the second actuator end 222 and the shaft side end of the cylinder housing of the actuator 216. In FIG. 11, the spring seat 205 is fixed to and extends radially outwardly from both the damper 208 and the actuator 216. In FIG. 12, the spring seat 205 is fixed to and extends radially outwardly from only the damper 208. The spring seat 205 includes an opening 244, which receives the actuator 216. The opening 244 is larger (e.g., has a larger diameter than) the actuator 216 such that the actuator 216 passes through the opening 244 in the spring seat 205 and does not support the spring seat 205. In FIG. 13, the spring seat 205 is fixed to and extends radially outwardly from only the actuator 216. The spring seat 205 includes an opening 246, which receives the damper 208. The opening 246 is larger (e.g., has a larger diameter) than the damper 208 such that the damper 208 passes through the opening 246 in the spring seat 205 and does not support the spring seat 205. In FIG. 14, the spring seat 205 is configured to be mounted to the lower suspension arm 226. The spring seat 205 in this configuration includes a damper mount 248 and an actuator mount 250 to which the damper 208 and the actuator 216 can be mounted respectively.

With reference to FIGS. 15-23, various other configurations of damper system 22a are shown. In each of these configurations, coil spring 300 extends helically about a spring axis 302 and longitudinally between a first spring end 304 and a second spring end 306. The first spring end 304 abuts a spring seat 305 and the second spring end 306 abuts an upper mount 307 that is connected to the body 16 of the vehicle 10. Damper 308 extends longitudinally along a damper axis 310 between a first damper end 312 and a second damper end 314. Actuator 316 extends longitudinally along an actuator axis 318 between a first actuator end 320 and a second actuator end 322. The damper 308 and the actuator 316 are positioned within a cylindrical packaging envelope 324 that has a diameter D of 300 millimeters or less with the actuator axis 318 spaced from and substantially parallel to the damper axis 310. Accordingly, it should be appreciated that the actuator 316 is separate and spaced apart from the damper 308 as opposed to an arrangement where the actuator 316 is integrated into the damper 308, such as where the damper axis 310 and the actuator axis 318 are co-axially aligned. It should be appreciated that while the cylindrical packaging envelope 324 has boundary lines, the cylindrical packaging envelope 324 represents a geometric space and therefor has no physical walls or frame. Unlike the embodiments shown in FIGS. 6-14, where coil spring 200 extends around both damper 208 and actuator 216, in the embodiments shown in FIGS. 15-23, the coil spring 300 extends about either the damper 308 or the actuator 316, but not both.

The front suspension 14 includes a lower suspension arm 326 and an upper suspension arm 328, which are pivotally connected to the body 16 of the vehicle 10. In the illustrated example, the first damper end 312 and the first actuator end 320 are pivotally connected to the lower suspension arm 326 and the second damper end 314 and the second actuator end 322 are pivotally connected to the upper mount 307. Of course it should be appreciated that other configurations are possible. For example, the orientation of the damper 308 and the actuator 316 could be reversed. As shown in FIGS. 15-23, the upper suspension arm 328 has a wish-bone shape and extends at least partially about the damper 308 and the actuator 316 to define a maximum size (i.e., diameter D) of the cylindrical packaging envelope 324.

Figure 16:
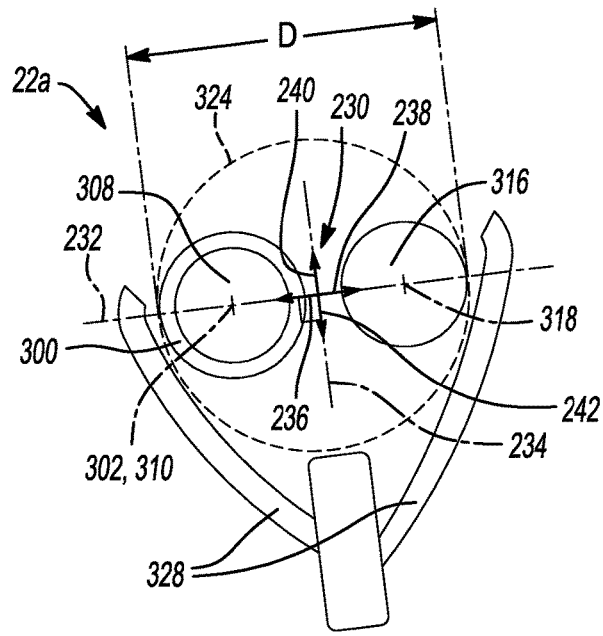
FIG. 16 is a top plan view of one exemplary configuration of the damper system illustrated in FIG. 15 where the damper is located forward of the actuator and the coil spring is positioned on the damper.
Figure 17:
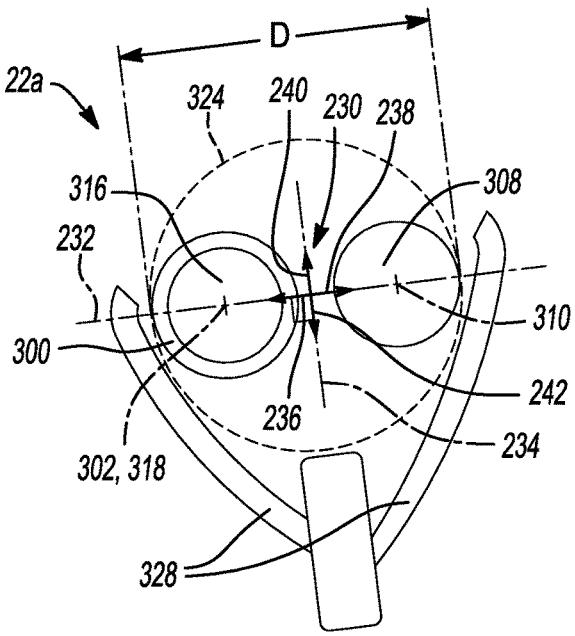
FIG. 17 is a top plan view of another exemplary configuration of the damper system illustrated in FIG. 15 where the actuator is located forward of the damper and the coil spring is positioned on the actuator.
Figure 18:
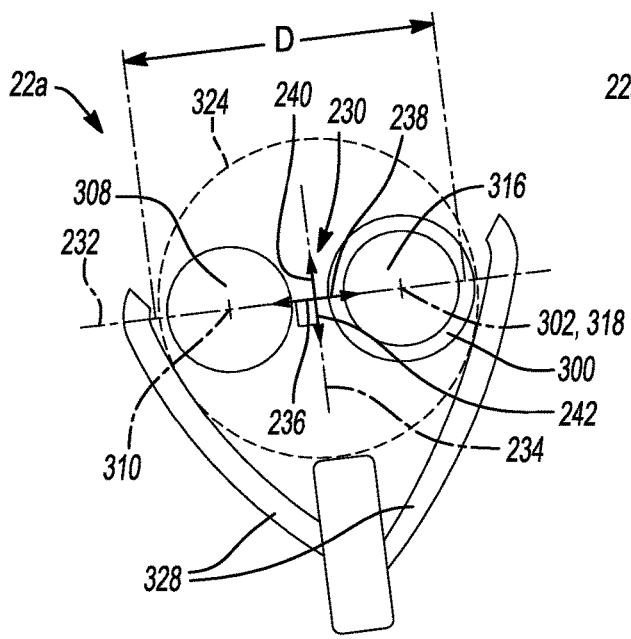
FIG. 18 is a top plan view of another exemplary configuration of the damper system illustrated in FIG. 15 where the damper is located forward of the actuator and the coil spring is positioned on the actuator.
Figure 19:
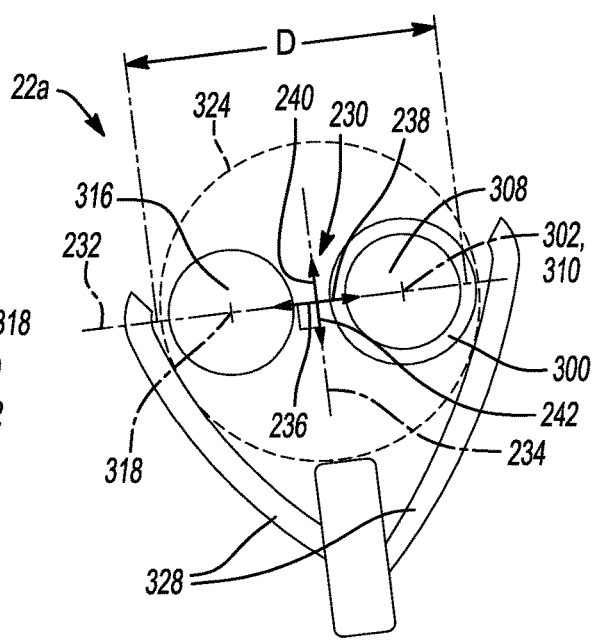
FIG. 19 is a top plan view of another exemplary configuration of the damper system illustrated in FIG. 15 where the actuator is located forward of the damper and the coil spring is positioned on the damper.

The position of the damper 308 and the actuator 316 in FIGS. 16-23 can be described with reference to the Cartesian coordinate system 230 described above. In FIGS. 16-19, the damper 308 and the actuator 316 are arranged along the x-axis 232 of the Cartesian coordinate system 230. In other words, the damper axis 310 and the actuator axis 318 intersect the x-axis 232 of the Cartesian coordinate system 230. In FIG. 16, the damper 308 is positioned forward of the actuator 316. This means that the damper 308 is spaced from the actuator 316 in the forward direction 236, or in other words, the damper 308 is closer to the front end 13 of the vehicle 10 than the actuator 316. In FIG. 16, the coil spring 300 extends annularly about the damper 308 only such that the spring axis 302 is co-axial with the damper axis 310. The spring seat 305 therefore may be fixed to and extends annularly about the outer tube of the damper 308. In FIG. 17, the relative position of the damper 308 and the actuator 316 have been reversed. In FIG. 17, the actuator 316 is positioned forward of the damper 308. This means that the actuator 316 is spaced from the damper 308 in the forward direction 236, or in other words, the actuator 316 is closer to the front end 13 of the vehicle 10 than the damper 308. In FIG. 17, the coil spring 300 extends annularly about the actuator 316 only such that the spring axis 302 is co-axial with the actuator axis 318. The spring seat 305 therefore may be fixed to and extends annularly about the cylinder housing of the actuator 316. In FIG. 18, the damper 308 is again positioned forward of the actuator 316; however, in this configuration the coil spring 300 extends annularly about the actuator 316 only such that the spring axis 302 is co-axial with the actuator axis 318. The spring seat 305 therefore may be fixed to and extends annularly about the cylinder housing of the actuator 316. In FIG. 19, the actuator 316 is again positioned forward of the damper 308; however, in this configuration the coil spring 300 extends annularly about the damper 308 only such that the spring axis 302 is co-axial with the damper axis 310. The spring seat 305 therefore may be fixed to and extends annularly about the outer tube of the damper 308.

Figure 20:
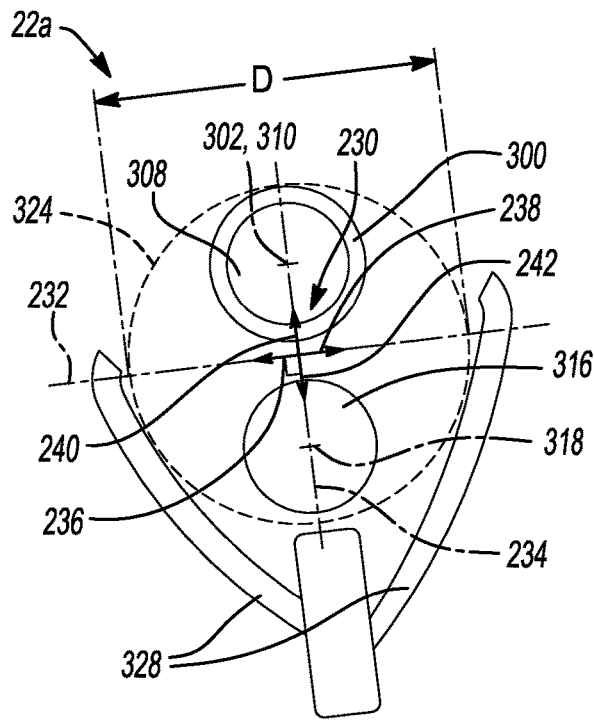
FIG. 20 is a top plan view of another exemplary configuration of the damper system illustrated in FIG. 15 where the damper is located inboard of the actuator and the coil spring is positioned on the damper.
Figure 21:
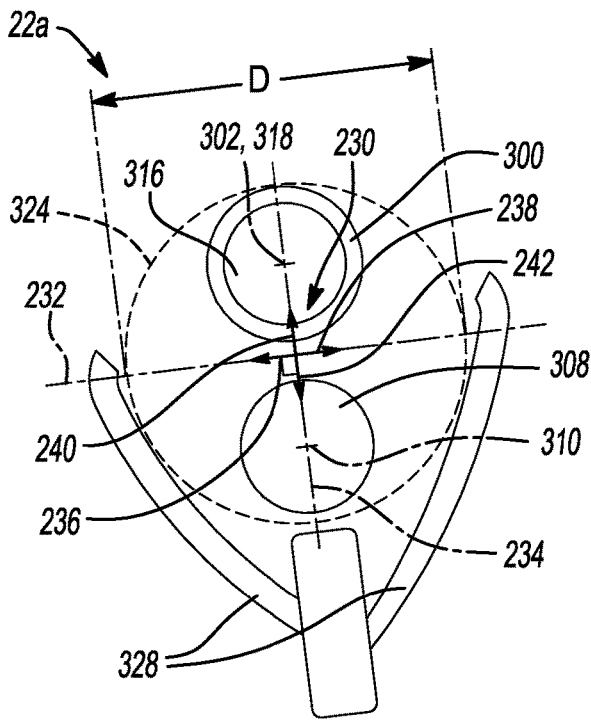
FIG. 21 is a top plan view of another exemplary configuration of the damper system illustrated in FIG. 15 where the damper is located outboard of the actuator and the coil spring is positioned on the actuator.
Figure 22:
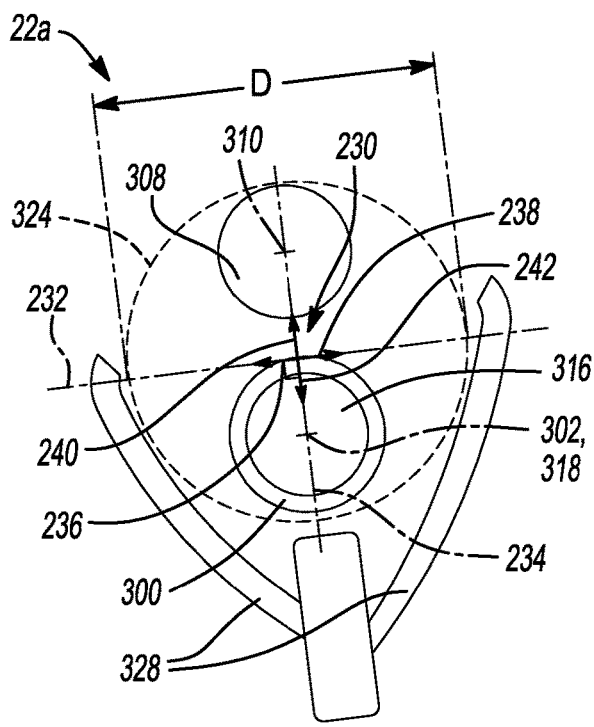
FIG. 22 is a top plan view of another exemplary configuration of the damper system illustrated in FIG. 15 where the damper is located inboard of the actuator and the coil spring is positioned on the actuator.
Figure 23:
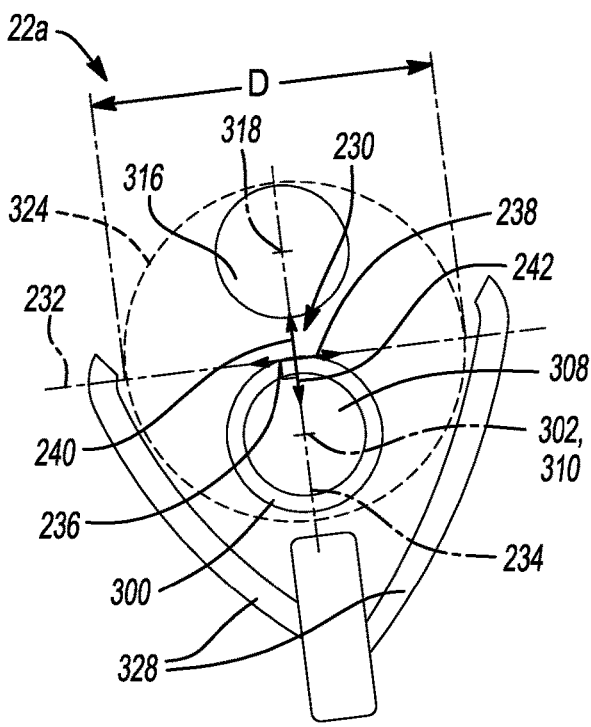
FIG. 23 is a top plan view of another exemplary configuration of the damper system illustrated in FIG. 15 where the damper is located outboard of the actuator and the coil spring is positioned on the damper.
Figure 24:
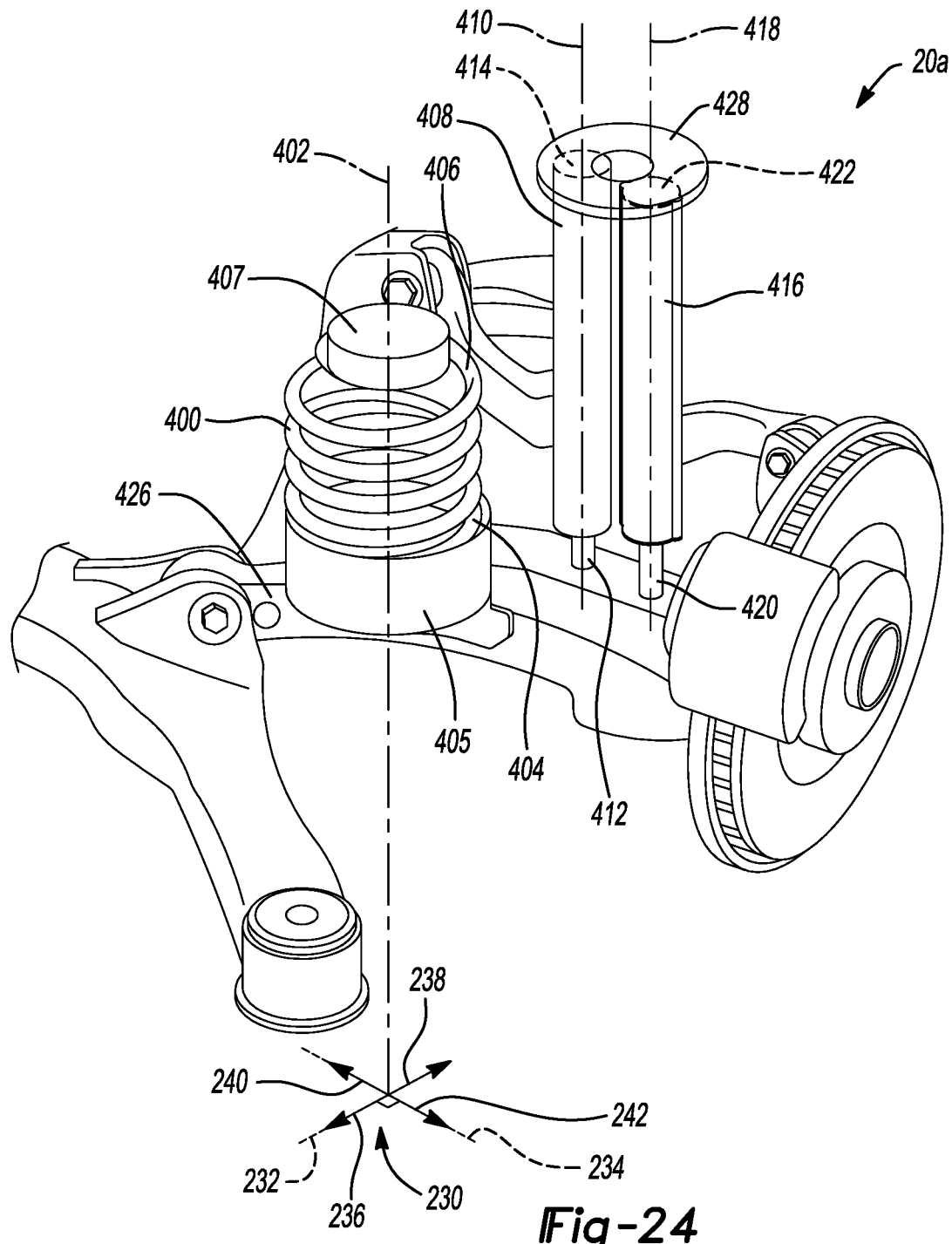
FIG. 24 is a side perspective view of another exemplary damper system constructed in accordance with the teachings of the present disclosure.

In FIGS. 20-23, the damper 308 and the actuator 316 are arranged along the y-axis 234 of the Cartesian coordinate system 230. In other words, the damper axis 310 and the actuator axis 318 intersect the y-axis 234 of the Cartesian coordinate system 230. In FIG. 20, the damper 308 is positioned inboard of the actuator 316. This means that the damper 308 is spaced from the actuator 316 in the inboard direction 240, or in other words, the damper 308 is closer to the centerline 17 of the vehicle 10 than the actuator 316. In FIG. 20, the coil spring 300 extends annularly about the damper 308 only such that the spring axis 302 is co-axial with the damper axis 310. The spring seat 305 therefore may be fixed to and extends annularly about the outer tube of the damper 308. In FIG. 21, the relative position of the damper 308 and the actuator 316 have been reversed. In FIG. 21, the damper 308 is positioned outboard of the actuator 316. This means that the damper 308 is spaced from the actuator 316 in the outboard direction 242, or in other words, the actuator 316 is closer to the centerline 17 of the vehicle 10 than the damper 308. In FIG. 21, the coil spring 300 extends annularly about the actuator 316 only such that the spring axis 302 is co-axial with the actuator axis 318. The spring seat 305 therefore may be fixed to and extends annularly about the cylinder housing of the actuator 316. In FIG. 22, the damper 308 is again positioned inboard of the actuator 316; however, in this configuration the coil spring 300 extends annularly about the actuator 316 only such that the spring axis 302 is co-axial with the actuator axis 318. The spring seat 305 therefore may be fixed to and extends annularly about the cylinder housing of the actuator 316. In FIG. 23, the damper 308 is again positioned outward of the actuator 316; however, in this configuration the coil spring 300 extends annularly about the damper 308 only such that the spring axis 302 is co-axial with the damper axis 310. The spring seat 305 therefore may be fixed to and extends annularly about the outer tube of the damper 308.

With reference to FIGS. 24-28, various configurations of damper system 20a are shown. In each of these configurations, coil spring 400 extends helically about a spring axis 402 and longitudinally between a first spring end 404 and a second spring end 406. The first spring end 404 abuts a spring seat 405 and the second spring end 406 abuts an upper spring mount 407 that is connected to the body 16 of the vehicle 10. Damper 408 extends longitudinally along a damper axis 410 between a first damper end 412 and a second damper end 414. Actuator 416 extends longitudinally along an actuator axis 418 between a first actuator end 420 and a second actuator end 422. The damper 408 and the actuator 416 are positioned within a cylindrical packaging envelope 424 that has a diameter D of 300 millimeters or less with the actuator axis 418 spaced from and substantially parallel to the damper axis 410. Accordingly, it should be appreciated that the actuator 416 is separate and spaced apart from the damper 408 as opposed to an arrangement where the actuator 416 is integrated into the damper 408, such as where the damper axis 410 and the actuator axis 418 are co-axially aligned. It should be appreciated that while the cylindrical packaging envelope 424 has boundary lines, the cylindrical packaging envelope 424 represents a geometric space and therefore has no physical walls or frame. Unlike the embodiments shown in FIGS. 6-14 and FIGS. 15-23, the coil spring 400 in FIGS. 24-28 is spaced from the damper axis 410 and the actuator axis 418 and is therefore located outside the cylindrical packaging envelope 424.

The rear suspension 12 includes a trailing arm 426 that is pivotally connected to the body 16 of the vehicle 10. In the illustrated example, the first damper end 412 and the first actuator end 420 are pivotally connected to the trailing arm 426 and the second damper end 414 and the second actuator end 422 are pivotally connected to an upper mount 428 that is separate and spaced away from the upper spring mount 407. The spring seat 405 is also connected to the trailing arm 426 at a position that is spaced from the damper axis 410 and the actuator axis 418.

Figure 25:
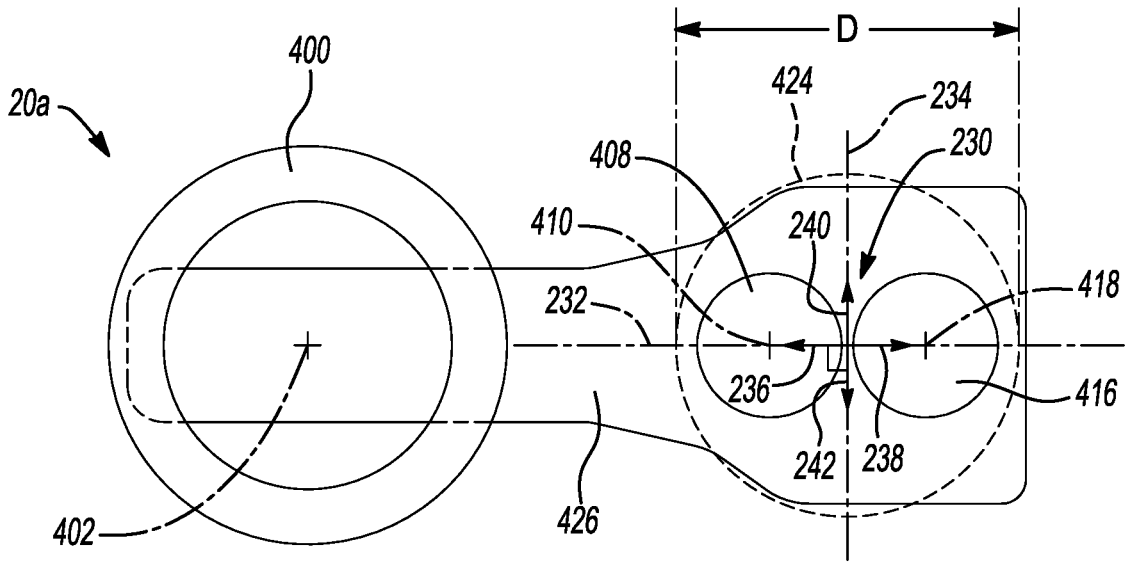
FIG. 25 is a top plan view of one exemplary configuration of the damper system illustrated in FIG. 24 where the damper is located forward of the actuator.
Figure 26:
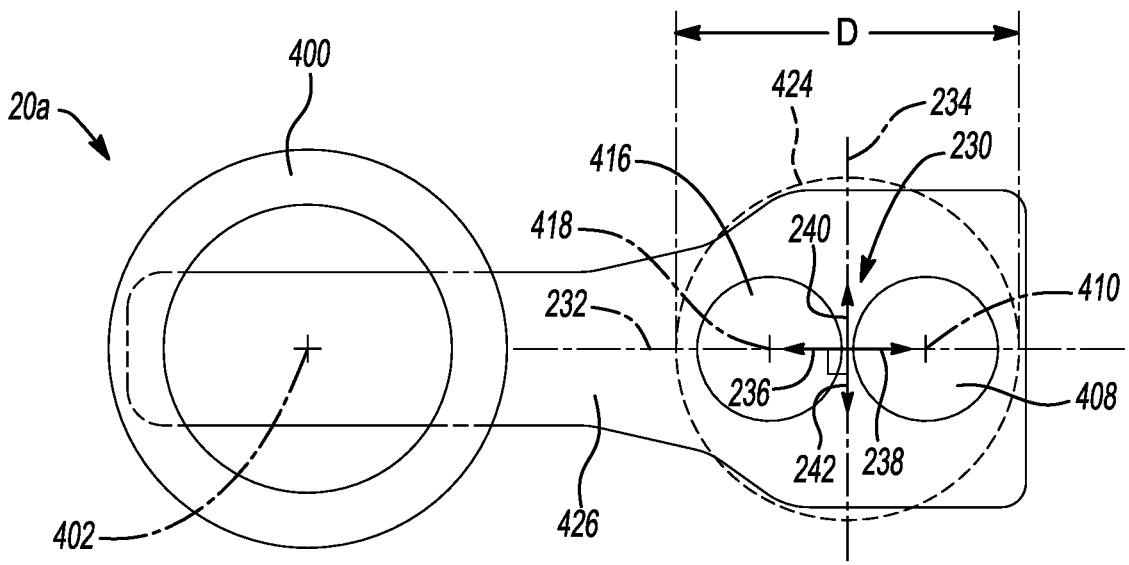
FIG. 26 is a top plan view of another exemplary configuration of the damper system illustrated in FIG. 24 where the actuator is located forward of the damper.

The position of the damper 408 and the actuator 416 in FIGS. 24-28 can be described with reference to the Cartesian coordinate system 230 described above. In FIGS. 25 and 26, the damper 408 and the actuator 416 are arranged along the x-axis 232 of the Cartesian coordinate system 230. In other words, the damper axis 410 and the actuator axis 418 intersect the x-axis 232 of the Cartesian coordinate system 230. In FIG. 25, the damper 408 is positioned forward of the actuator 416. This means that the damper 408 is spaced from the actuator 416 in the forward direction 236, or in other words, the damper 408 is closer to the front end 13 of the vehicle 10 than the actuator 416. In FIG. 26, the relative position of the damper 408 and the actuator 416 have been reversed. In FIG. 26, the actuator 416 is positioned forward of the damper 408. This means that the actuator 416 is spaced from the damper 408 in the forward direction 236, or in other words, the actuator 416 is closer to the front end 13 of the vehicle 10 than the damper 408.

Figure 27:
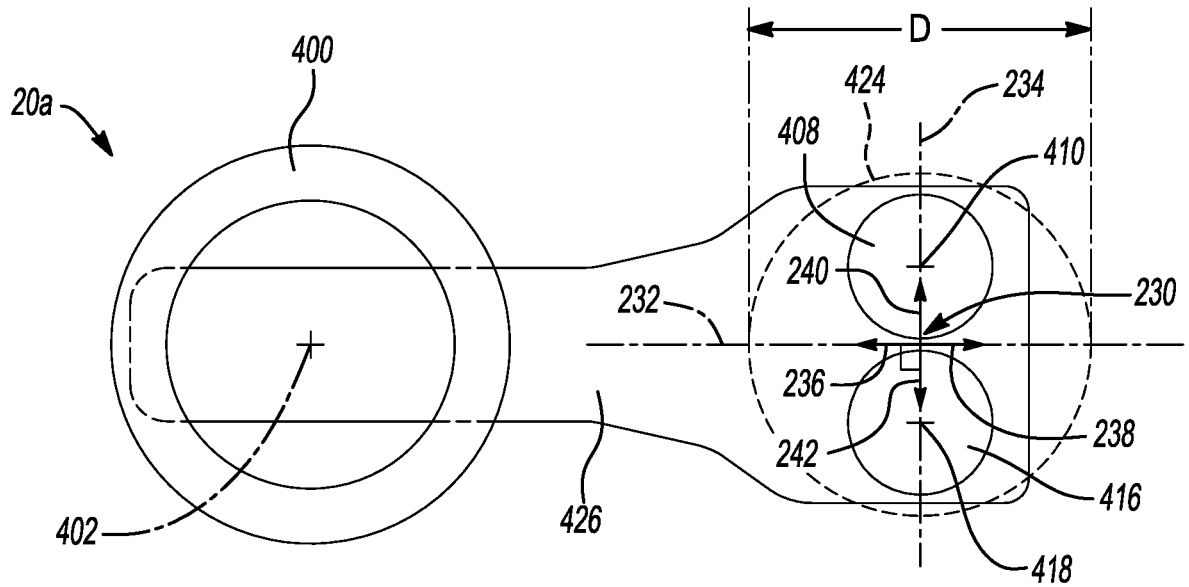
FIG. 27 is a top plan view of another exemplary configuration of the damper system illustrated in FIG. 24 where the damper is located inboard of the actuator.
Figure 28:
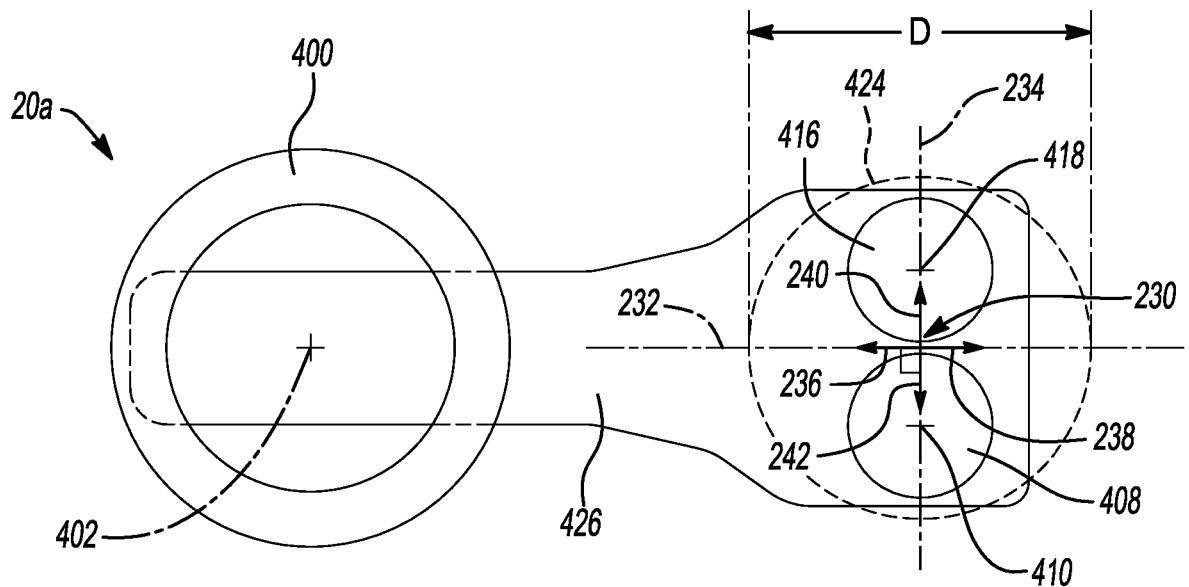
FIG. 28 is a top plan view of another exemplary configuration of the damper system illustrated in FIG. 24 where the damper is located outboard of the actuator.

In FIGS. 27 and 28, the damper 408 and the actuator 416 are arranged along the y-axis 234 of the Cartesian coordinate system 230. In other words, the damper axis 410 and the actuator axis 418 intersect the y-axis 234 of the Cartesian coordinate system 230. In FIG. 27, the damper 408 is positioned inboard of the actuator 416. This means that the damper 408 is spaced from the actuator 416 in the inboard direction 240, or in other words, the damper 408 is closer to the centerline 17 of the vehicle 10 than the actuator 416. In FIG. 28, the relative position of the damper 408 and actuator 416 have been reversed. In FIG. 28, the damper 408 is positioned outboard of the actuator 416. This means that the damper 408 is spaced from the actuator 416 in the outboard direction 242, or in other words, the actuator 416 is closer to the centerline 17 of the vehicle 10 than the damper 408.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the subject disclosure, and all such modifications are intended to be included within the scope of the subject disclosure.

What is claimed is:

1. A damper system for a vehicle, comprising:
   a damper extending longitudinally along a damper axis between a first damper end and a second damper end; and
   an actuator that is separate and spaced apart from the damper, the actuator extending longitudinally along an actuator axis between a first actuator end and a second actuator end,
   wherein the damper and the actuator are arranged next to one another with the actuator axis spaced from and substantially parallel to the damper axis,
   wherein the damper and the actuator are positioned within a cylindrical packaging envelope that has a diameter of 300 millimeters or less.

2. The damper system of claim 1, wherein the damper and the actuator are positioned in a Cartesian coordinate system with an x-axis that is substantially parallel with a driving direction of the vehicle and a y-axis that is substantially perpendicular to the driving direction of the vehicle, the x-axis extending in a forward direction that points toward a front end of the vehicle and a rearward direction that points toward a rear end of the vehicle, the y-axis extending in an inboard direction that points toward a centerline of the vehicle and an outboard direction that points away from the centerline of the vehicle.

3. The damper system of claim 2, wherein the damper axis and the actuator axis intersect the x-axis of the Cartesian coordinate system.

4. The damper system of claim 3, wherein the damper is positioned forward of the actuator.

5. The damper system of claim 3, wherein the actuator is positioned forward of the damper.

6. The damper system of claim 2, wherein the damper axis and the actuator axis intersect the y-axis of the Cartesian coordinate system.

7. The damper system of claim 6, wherein the damper is positioned inboard of the actuator.

8. The damper system of claim 6, wherein the damper is positioned outboard of the actuator.

9. The damper system of claim 1, further comprising:
   a coil spring extending helically about a spring axis between a first spring end and a second spring end.

10. The damper system of claim 9, wherein the coil spring extends annularly about the damper and the actuator such that the coil spring defines the cylindrical packaging envelope of the damper system.

11. The damper system of claim 10, further comprising:
    a spring seat extending around the damper and the actuator, the spring seat supporting the first spring end.

12. The damper system of claim 11, wherein the spring seat is fixed to and extends radially outwardly from the damper and the actuator.

13. The damper system of claim 11, wherein the spring seat is fixed to and extends radially outwardly from the damper and wherein the spring seat includes an opening that receives the actuator.

14. The damper system of claim 11, wherein the spring seat is fixed to and extends radially outwardly from the actuator and wherein the spring seat includes an opening that receives the damper.

15. The damper system of claim 11, further comprising:
    a lower suspension arm and wherein the spring seat is mounted to the lower suspension arm.

16. The damper system of claim 9, wherein the coil spring extends annularly about the damper such that the spring axis is co-axial with the damper axis and is spaced from the actuator axis.

17. The damper system of claim 9, wherein the coil spring extends annularly about the actuator such that the spring axis is co-axial with the actuator axis and is spaced from the damper axis.

18. The damper system of claim 1, further comprising:
    an upper suspension arm extending at least partially about the damper and the actuator to define the cylindrical packaging envelope of the damper system.

19. The damper system of claim 1, wherein the actuator is connected to an external energy source and is one of a hydraulic actuator, a pneumatic actuator, and an electromagnetic actuator.

20. A damper system for a vehicle, comprising:
    a coil spring configured to apply a biasing force to the vehicle, the coil spring having an inner diameter;
    a damper configured to apply a damping force to the vehicle that dampens vehicle vibrations, the damper extending longitudinally along a damper axis between a first damper end and a second damper end; and
    an actuator that is separate and spaced apart from the damper and configured to apply an active force to the vehicle that operates in substantially the same direction as the biasing force of the coil spring, the actuator extending longitudinally along an actuator axis between a first actuator end and a second actuator end,
    wherein the damper and the actuator are arranged next to one another within the inner diameter of the coil spring with the actuator axis spaced from and substantially parallel to the damper axis.

* * * * *